United States Patent [19]

Homma et al.

[11] Patent Number: 4,839,506
[45] Date of Patent: Jun. 13, 1989

[54] IC CARD IDENTIFICATION SYSTEM INCLUDING PIN-CHECK TIME MEANS

[75] Inventors: Satoshi Homma; Tohru Watanabe, both of Tokyo, Japan

[73] Assignee: Casio Computer Co., Ltd., Tokyo, Japan

[21] Appl. No.: 39,325

[22] Filed: Apr. 16, 1987

[30] Foreign Application Priority Data

Apr. 25, 1986 [JP] Japan .................................. 61-96530

[51] Int. Cl.$^4$ ........................................... G06F 15/30
[52] U.S. Cl. .................................. 235/379; 235/492; 902/5
[58] Field of Search ............... 902/4, 5; 235/380, 492, 235/379

[56] References Cited

U.S. PATENT DOCUMENTS

| 3,953,769 | 4/1976 | Sopko . | |
|---|---|---|---|
| 4,092,524 | 5/1978 | Moreno . | |
| 4,211,919 | 7/1980 | Ugon . | |
| 4,449,040 | 5/1984 | Matsuoka et al. | 902/5 X |
| 4,591,704 | 5/1986 | Sherwood et al. | 235/380 |
| 4,614,861 | 9/1986 | Pavlov et al. | 235/380 |
| 4,667,087 | 5/1987 | Quintana | 235/380 |
| 4,697,072 | 9/1987 | Kawana | 235/379 X |

FOREIGN PATENT DOCUMENTS

| A-0038425 | 3/1981 | European Pat. Off. . |
| A-0186038 | 7/1986 | European Pat. Off. . |
| A-2471003 | 6/1981 | France . |
| A-2088605 | 6/1982 | United Kingdom . |

Primary Examiner—David L. Trafton
Attorney, Agent, or Firm—Frishauf, Holtz, Goodman & Woodward

[57] ABSTRACT

An IC (integrated circuit) card identification system includes a comparator for comparing a first identification number entered by a cardholder with a second identification number, a storage memory for storing at least the second identification number, a timer for measuring a time lapse during a card-identifying operation, and a central controller for controlling the timer to set a first processing time period to be substantially equal to a second processing time period. During the first processing time period, the comparator determines that the first identification number is coincident with the second identification number since the first identification number has been entered. During the second processing time period, the comparator determines that the first identification number is incoincident with the second identification number since the first identification number has been entered.

7 Claims, 4 Drawing Sheets

IC CARD IDENTIFICATION SYSTEM INCLUDING PIN-CHECK TIME MEANS

BACKGROUND OF THE INVENTION

1. Field of the Invention

The present invention relates to an identification system for IC (integrated circuit) cards.

2. Description of the Prior Art

A conventional magnetic card is well known as such an article identification system. The magnetic card has a magnetic coating stripe on which a key code, a confidential number, an account number, etc. are magnetically recorded. These magnetically recorded contents, e.g., the key code, are known to at least bank personnel because a cardholder must disclose his key code to the bank. What is more, the magnetically recorded information may be relatively easily accessed by anyone. In view of such easy accessibility, the private confidential information of the conventional magnetic card may not be securely kept secret.

Instead of a conventional magnetic card, an IC card incorporating an IC (integrated circuit) module has recently been proposed. Accordingly, no one can easily gain access to the confidential information stored in the IC module.

Although it is very hard to read out the confidential information from the IC card, there is no way to identify the authorized cardholder if the IC card per se is forged.

In such an IC card, since the security in use is extremely important, hitherto, the validity of the IC card has been identified in the following manner in order to prevent the illegal use of the IC card. That is, when the IC card is actually used to buy an article or the like, the IC card is set into a card terminal and the private identification number "PIN" (personal identification number) is entered under this state to compare with the registered PIN "R-PIN" which has already been stored in the IC card. When the input "PIN" is coincident with the registered "R-PIN", the use of the IC card by the cardholder is permitted. To the contrary, when no coincidence is made, the reentering operation of the "PIN" is allowed for a predetermined number of times, e.g., 5 times. If the "PIN" is not coincident with "R-PIN" even after the "PIN" has been reentered a predetermined number of times, the use of this IC card is invalidated, or rejected.

According to the above-described conventional card identifying method, when the "PIN" coincides with the "R-PIN", the processing routine in the IC card can soon advance to the next processing step. However, when they do not coincide, a retry number "RTN" is counted up by only +1, and at the same time, it is necessary to provide means for determining whether the "RTN" has reached a predetermined number or not and the like, so that it takes some time to shift to the next processing step. As will be explained hereinafter, a difference is inherently made between the numbers of processing steps in both the cases where the entered "PIN" is coincident with the registered "R-PIN", and when the former is not coincident with the latter. As a result, the time periods required for those processing steps are different from each other. This implies that if the data transfer timing to the next processing step is somehow observed by a person who is illegally and experimentally attempting to determine the PIN by paying attention to such a time difference, it is possible to readily recognize whether the result of the comparison between the input "PIN" and the registered "PIN" is correct or not. Therefore, the "PIN" can be known by performing an illegal investigation, so that the security of the IC card is remarkably impaired and there is the risk that the illegal use of the IC card is eventually accomplished.

The present invention is made in consideration of the foregoing problems and it is an object of the invention to provide an IC card identification system in which the decryption of the personal identification number by an illegal approach can be completely blocked, the illegal use of the IC card is prevented, and the security in card use can be improved.

SUMMARY OF THE INVENTION

The above object of the invention is accomplished by providing an identification system of IC cards comprising means for comparing a first identification number entered by a cardholder with a second identification number previously stored in the IC card to determine whether or not said first identification number is coincident with said second identification number, storage means for storing at least said second identification number, means for measuring a time lapse during a card-identifying operation, and means for controlling the time measuring means to set a first processing time period to be substantially equal to a second processing time period, said first processing time period being defined by a first duration, after the cardholder enters the first identification number, during which said comparing means determines that the first identification number is coincident with the second identification number, and said second processing time period being defined by a second duration during which said comparing means determines that the first identification number entered by the cardholder is incoincident with the second identification number.

BRIEF DESCRIPTION OF THE DRAWINGS

For a better understanding of the present invention, reference is made in the following description in conjunction with the drawings, in which.

DETAILED DESCRIPTION OF THE PREFERRED EMBODIMENTS

Basic Idea

The basic idea of the IC card identification system according to the present invention is as follows. In this IC card identification system, the personal identification number (PIN) input via a card terminal into the IC card is compared with the registered personal identification number (R-PIN) which has previously been stored in the IC card. Then, it is determined on the basis of the result of the comparison whether they are coincident or incoincident. When they are incoincident, the reentering operation of the "PIN" is permitted and the retry number is counted. It is decided whether the retry number has reached a predetermined number or not. When it has reached the predetermined number, the use of the IC card is invalidated. This IC card identification system has the following feature: A first processing time period is defined by a time period required to process the steps from the entry of the "PIN" until a signal representative of the coincidence of the comparison result is output. A second processing time period is defined by another time period required to process the steps from the entry of the "PIN" until an incoincident signal is output, and itineration steps including the time for the counting-up step of the retry number of the "PIN" and the time for the determining step concerned with whether the retry number has reached the predetermined number or not. It is decided that the first processing time period is substantially equal to the second processing time period. Moreover, both of these processing time periods are constant with respect to the time lapse.

Arrangement of IC Card

Figure 1:
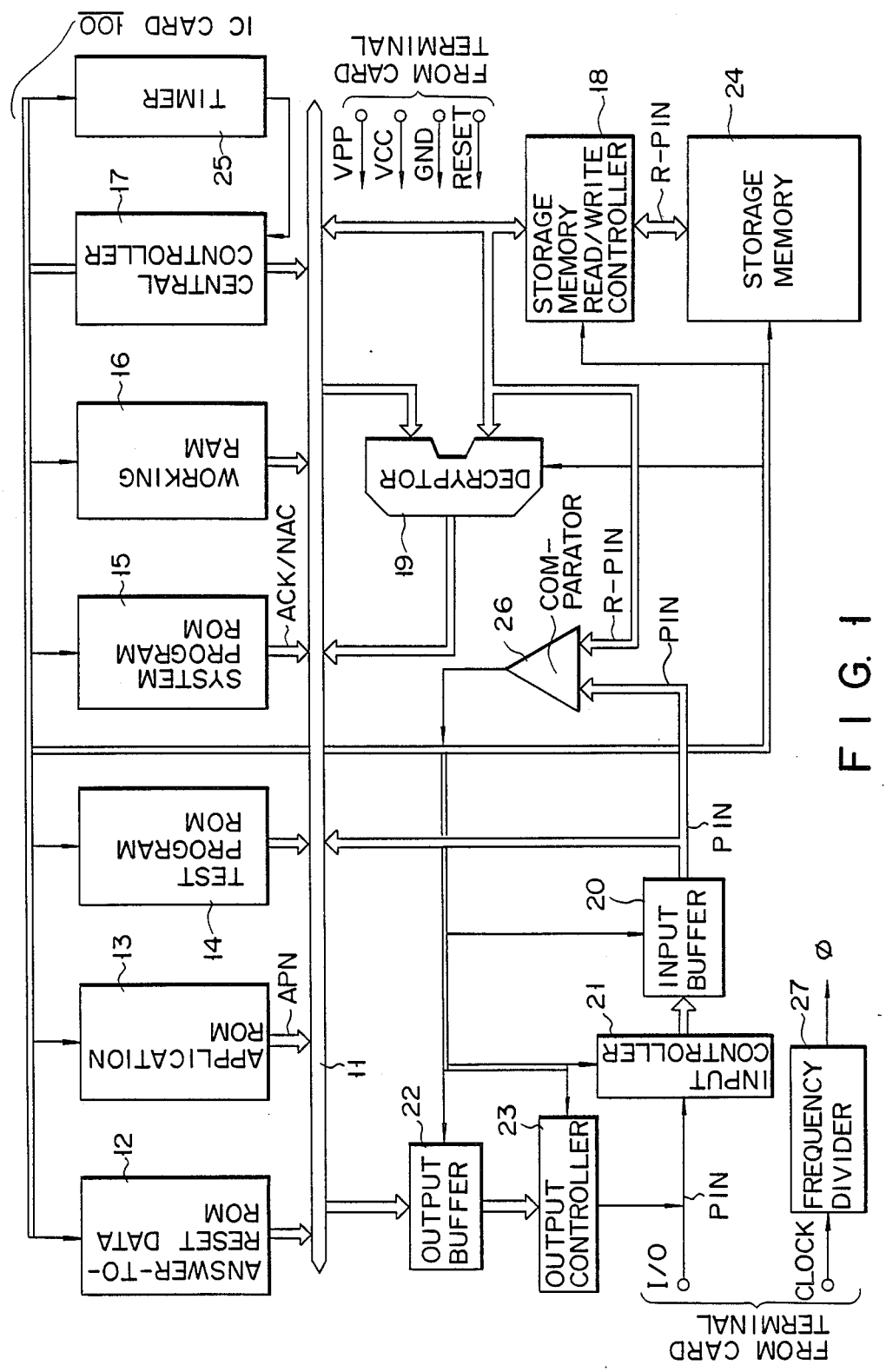
FIG. 1 is a schematic block diagram of the entire IC card identification system according to the invention.

FIG. 1 shows a circuit arrangement of IC card 100 according to the invention. In the circuit, a system bus line 11 is employed. As shown in the diagram, there are connected to system bus line 11: an answer-to-reset data ROM 12; application ROM 13; test program ROM 14; system program ROM 15; working RAM 16; central controller 17; storage memory read/write controller 18; decryptor 19; input controller 21 through input buffer 20; and output controller 23 through output buffer 22. Data input/output terminal I/O is connected to input controller 21 and output controller 23.

Answer-to-reset data ROM 12 stores various operating condition data for an IC card 100. For example, ROM 12 stores the data with respect to the writing of data, supply voltage, maximum current, maximum supply voltage, maximum data transmission amount, maximum response waiting time, and the like. After completion of the self-initialization of IC card 100, those condition data are transmitted as answer-to-reset data to a card terminal (not shown) in accordance with a predetermined format.

Application ROM 13 stores a card classification data "APN" indicative of the type of IC card 100. After initial parameters based on the answer-to-reset data have been set, the card classification data is transmitted in accordance with the predetermined format upon exchange of attribute data with the card terminal.

Test program ROM 14 stores the program to execute the card test routine.

System program ROM 15 stores not only various system programs, but also a code signal "ACK" or "NAC" indicating whether a signal transmitted from the card terminal is correct or not.

Working RAM 16 stores various processing data used in IC card 100.

Central controller 17 outputs operation commands to various circuits in response to a data reception signal which is supplied from the card terminal through an input buffer 20 and in response to the operating conditions.

Storage memory read/write controller 18 controls the writing/reading operations of data into/from storage memory 24 in response to a command from central controller 17.

Decryptor 19 decrypts on the basis of a predetermined algorithm, the input data which is supplied from the card terminal through input buffer 20 by use of a private key code "PRK" or the like from secret data zone 243 in storage memory 24.

Timer 25 is connected to central controller 17. Timer 25 presets the time required to execute the card identifying process to a predetermined time. Before the entry of the "PIN" is started, this predetermined time is set in response to a command of central controller 17. When the "PIN" is entered, time 25 starts its counting. After a predetermined time elapses, timer 25 interrupts the operation of central controller 17. It should be noted that this predetermined time, which is set into timer 25, is determined by taking account of the maximum time period required to identify the "PIN".

The contents of storage memory 24 readable by controller 18 are given to one input terminal of comparator 26. The input data decrypted by decryptor 19, the data stored in working RAM 16, and the specific code stored in data ROM 12, are supplied to the other input terminal of comparator 26. The comparison output of comparator 26 is sent to central controller 17.

When an IC card system with the above-described circuit arrangement is loaded into a card terminal (not shown), a reset signal "Reset" and a system clock "Clock" are supplied from the card terminal to IC card 100 and at the same time, a Vcc power source and a Vpp power source are connected thereto. The Vcc power source is used to drive the IC card system. The Vpp power source is used to write data into storage memory 24. The supply voltage Vpp is set in the card terminal on the basis of the answer-to-reset data which is stored in data ROM 12. On the other hand, a system operation signal from system clock "Clock" is supplied to various circuits in the IC card system through a frequency divider 27. Thus, a frequency-divided clock "$\phi$" is derived from frequency divider 27.

Memory Map of Storage Memory

Figure 2:
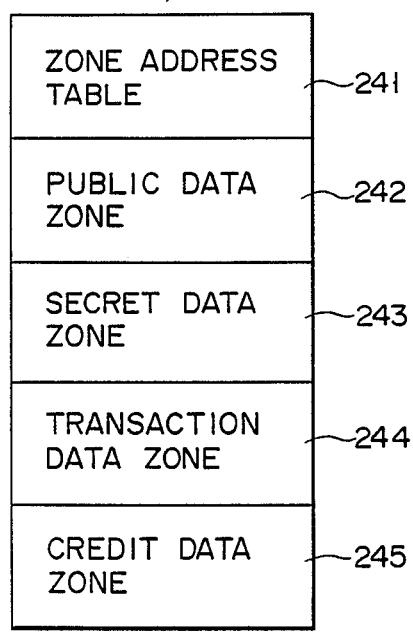
FIG. 2 illustrates a memory map of the storage memory shown in FIG. 1.

In the preferred embodiment, as illustrated in FIG. 2, storage memory 24 includes zone address table 241, public data zone 242, secret data zone 243, transaction data zone 244, and credit data zone 245. Zone address table 241 stores a predetermined zone address as test data which is used, for instance, to identify the IC card. The identification data is read out from a predetermined data zone on the basis of the address data and then identified with the above-described test data, thereby performing the card identification. Public data zone 242 stores public data. Secret data zone 243 stores, for example, the registered personal identification number "R-PIN", data retry number "RTN", initialization personal identification number "IPIN" that is utilized until the personal identification number "PIN" is used, account number "PAN" (primary account number), decryption code "PRK" (private key code), and the like. Transaction data zone 244 stores various data regarding the normal transaction. Credit data zone 245 stores the data concerned with the credit transaction, e.g., data such as an allowance in the credit transaction.

Pin Identification System

The operation of the IC card system will now be described with reference to the circuit diagram of FIG. 1 and a flowchart shown in FIG. 3.

Card Initialization

The operation of IC card 100 after it is loaded into the card terminal (not shown) until the personal identification number "PIN" is entered in this condition, i.e., the operation for the card initialization will first be briefly described. In this case, when IC card 100 is set into the card terminal, an initialization signal which has previously been set in the card terminal is transmitted to IC card 100. Then, IC card 100 is made operative under the operating condition based on this initialization signal. Specifically, the answer-to-reset data stored in data ROM 12 is read out under the control of central controller 17 in IC card 100. This answer-to-reset data is sent from the I/O terminal to the card terminal through output controller 23.

When determination is made that the answer-to-reset data sent to the card terminal is correct, the specific operating conditions for use in only the IC card is set and at the same time, an enquiry code "ENQ" is returned to the IC card. This "ENQ" is written into working RAM 16. In this state, a check is made in central controller 17 whether or not the "ENQ" code can be legally received under the normal operation. If the answer is YES, the signal "ACK" is derived from system program ROM 15. If NO, the signal "NAC" is derived from ROM 15. The signal "ACK" or "NAC" is then sent to the card terminal through output buffer 22 and output controller 23. When the signal "ACK" is received by the card terminal, a terminal code "TC", which differs, depending on the classification of the card terminal, is returned. On the other hand, when the signal "NAC" is received, the card terminal is disconnected from IC card 100. When the terminal code "TC" is sent from the card terminal, an application name "APN" stored in application ROM 13 is read out in IC card 100 under the control of central controller 17. This application name "APN" differs, depending on the classification of card. Thus, the read application name "APN" is latched once in output buffer 22 and thereafter, it is returned to the card terminal. Subsequently, in the card terminal, when it is determined on the basis of the "APN" that the application kind coincides with the content of the "APN", an instruction code is returned. On the other hand, when they are incoincident, the card terminal is disconnected from this IC card.

Upon reception of such an instruction code, the entry of the "PIN" from the card terminal is permitted.

Pin Identification

Figure 3:
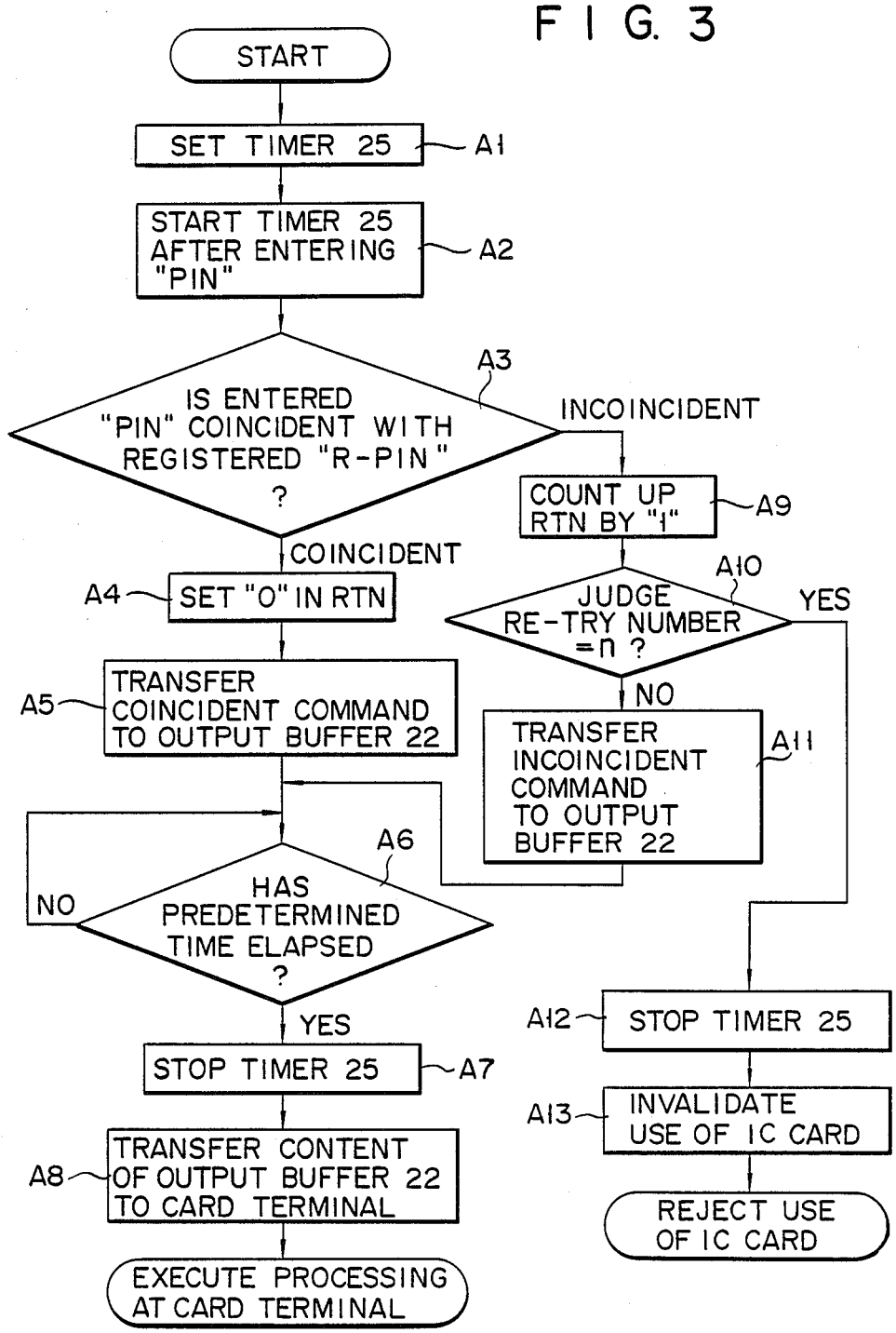
FIG. 3 is a flowchart for explaining the card identification system shown in FIG. 1.
Figure 4:
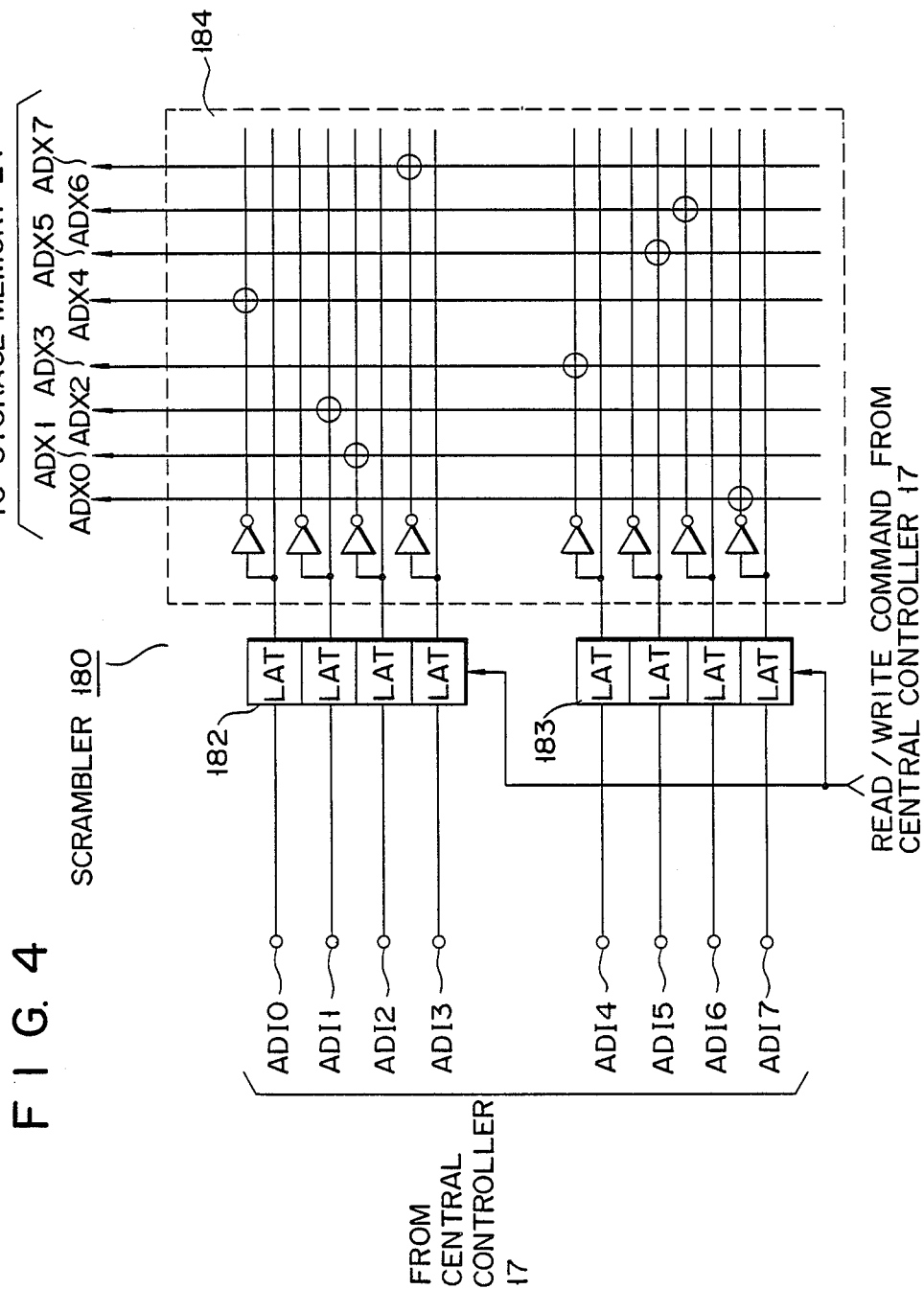
FIG. 4 is a schematic block diagram of the scrambler in the identification system shown in FIG. 1.

In this state, the processing advances to step A1 in the flowchart shown in FIG. 3. In step A1, timer 25 is set by a command sent from central controller 17 of FIG. 1 before the entry of the "PIN". In this case, the time data to be set into timer 25 is derived from system program ROM 15.

Thereafter, when the "PIN" is entered through a keyboard (not shown) provided on the card terminal, this "PIN" is transmitted from the I/O terminal of IC card 100 to input buffer 20 through input controller 21. Simultaneously with the start of the entry of the "PIN" at this time, timer 25 starts its counting as defined in step A2. Then, it advances to step A3.

From step A2, the above-described first and second processing time periods will commence.

In step A3, when it is confirmed by central controller 17 that the "PIN" has been entered, the "PIN" latched in input buffer 20 is supplied to comparator 26 and at the same time, a read command to read the "R-PIN" from secret data zone 243 in storage memory 24 is given to storage memory read/write controller 18. The "R-PIN" is read out of secret data zone 243 through controller 18 and given to comparator 26. Comparator 26 compares the entered "PIN" sent from the card terminal with the registered "R-PIN" read out of storage memory 24. The result of the comparison is sent to central controller 17. In this case, if the "PIN" coincides with the "R-PIN", the processing goes to step A4 where the content of the retry number "RTN" of secret data zone 243 in storage memory 24 is set to "0". Thereafter, in next step A5, a coincident command for the entered "PIN" is transferred to output buffer 22. Thereafter, the operation advances to step A6.

In step A6, a check is made whether or not the counted time of timer 25 exceeds a preset time. If the answer is NO, the state of step A6 is held. Thereafter, when the counted time of timer 25 has passed the preset time, it advances to step A7 where the counting operation of timer 25 is stopped. Then, in next step A8, the content of output buffer 22 is transferred to the card terminal. Subsequently, the transaction processes, such as money transaction and the like, are executed in the card terminal.

As previously described, the period of time between which the PIN is entered in step A2 and timer 25 is stopped at step A7 is defined as the first processing time period. The first processing time period is always constant and does not change with the use of the card over a period of time.

The second processing time period will now be described. The second processing time period also does not change during the life of the card.

If it is decided in step A3 that the input "PIN" does not coincide with the "R-PIN", the processing advances to step A9.

In step A9, the data retry number "RTN" in secret data zone 243 of storage memory 24 is counted up by only 1 and the new retry number is rewritten into secret data zone 243. In the next step A10, a check is made whether or not the new data retry number "RTN" has reached a predetermined number "n". If it is smaller than the predetermined number "n", the processing goes to step A11 and an incoincident command for the "PIN" is transferred to output buffer 22.

In the next step A6, a check is similarly made whether or not the counted time of timer 25 has elapsed the above-described preset time. If the answer is NO, the state of step A6 is similarly held. Thereafter, when the preset time of timer 25 has elapsed, the operation goes to step A7 to thereby stop the counting operation of timer 25.

The second processing time period is defined as including the time from which the PIN is entered in step A2, the incident command is transferred in step A11 and timer 25 is stopped in step A7.

In the next step A8, the content of output buffer 22 is transferred to the card terminal. Thereafter, the card terminal displays a message on a terminal display section (not shown) so as to request the cardholder to reenter the "PIN". In this state, when the "PIN" is entered again, the processing operations similar to the above are repeated. On the other hand, if it is determined in step A10 that the data retry number is a predetermined number "n" (e.g., five) or more, the processing goes to step A12 where the counting operation of timer 25 is stopped. In the next step A13, the use of IC card 100 is invalidated and IC card 100 is then forcedly ejected to the outside of the card terminal. That is to say, the use of IC card 100 is rejected.

Address Scrambler

To further improve the security of various kinds of data, e.g., "PIN", which are temporarily stored in IC card 100, according to the invention, a scrambler 180 is introduced in address lines to storage memory 24, whereby the writing/reading operations of various kinds of data into/from storage memory 24 are executed by changing the writing/reading addresses to the memory addresses which are different from command addresses. Such an improvement in the data security is the final goal of the invention.

Specifically, scrambler 180 is provided in storage memory read/write controller 18. Scrambler 180 includes latch sections 182 and 183 having, e.g., eight address lines $ADI_0$ to $ADI_7$ and memory section 184, constructed of a mask ROM or the like, for receiving the outputs of latch sections 182 and 183. Memory section 184 performs a predetermined scramble processing and outputs the scrambled data to storage memory 24 through eight address lines $ADX_0$ to $ADX_7$. The addresses to storage memory 24 are scrambled by scrambler 180, thereby making the original addresses and the encrypted addresses different.

The detailed operation of scrambler 180 will now be explained.

First, when the 8-bit address data consisting of four upper bits and four lower bits are input to address lines $ADI_0$ to $ADI_7$ in response to a write command from a CPU, i.e., from central controller 17, these address data are latched once into latch sections 182 and 183. Thereafter, the 8-bit address data are supplied to memory section 184 in response to the write command from central controller 17. Memory section 184 stores other address data which are output to address lines $ADX_0$ through $ADX_7$ for storage memory 24 in correspondence with the first-mentioned address data which have been input from address lines $ADI_0$ to $ADI_7$. It is understood that the former address data input in address lines $ADI_0$ to $ADI_7$ are so-called "original address" data, whereas the latter output to address lines $ADX_0$ to $ADX_7$ are so-called "encrypted address" data.

In the preferred embodiment, when "0" is input to address line $ADI_0$, "1" is output to address line $ADX_4$. When "1" is input to address line $ADI_1$, "1" is output to address line $ADX_2$. When "0" is input to address line $ADI_2$, "1" is output to address line $ADX_1$. When "0" is input to address line $ADI_3$, "1" is output to address line $ADX_7$. When "0" is input to address line $ADI_4$, "1" is output to address line $ADX_3$. When "1" is input to address line $ADI_5$, "1" is output address line $ADX_5$. When "0" is input to address line $ADI_6$, "1" is output to address line $ADX_6$. When "0" is input to address line $ADI_7$, "1" is output to address line $ADX_0$.

In the final product of this embodiment, scrambler 180 is masked and its internal portion cannot be seen from the outside at all. That is to say, when the outer shield member of IC card 100 is removed, the IC module of the other circuit elements can be observed. However, the IC chip of scrambler 180 is set so that it cannot be observed, even in this condition, because it is masked.

The above-defined scrambling method is not limited to only this method but other scrambling methods can be obviously also used.

As a result of the above-described scrambling method, the address data (encrypted address) input to address lines $ADI_0$ to $ADI_7$ are changed to the totally different address data (original address) and output to storage memory 24 through address lines $ADX_0$ to $ADX_7$. Thus, when writing data into storage memory 24, the data is written into addresses which are completely different from the addresses corresponding to the commands on the CPU, i.e., on central controller 17.

In this case, as a practical example, assuming that the CPU has written data into the addresses of 3B(H) to 41(H) in storage memory 24, the address data which are actually received by storage memory 24 are respectively changed such that 3B(H) is changed to 67(H), 3C(H) to 71(H), 3D(H) to 61(H), 3E(H) to 75(H), 3F(H) to 65(H), 49(H) to 9B(H), and 41(H) to 8B(H).

Although writing the data into the memory section has been described above, the same scrambling method will also be applied to the reading operation of the data.

Therefore, with the above scrambler arrangement, by interposing the scrambler in the address lines between central controller 17 and memory section 184 to transfer the input address data for the storage memory, the writing/reading operations of the data into/from storage memory 24 can be executed for the output memory addresses which are different from the input addresses in accordance with commands from the CPU, without changing the program. Therefore, for instance, even if continuous addresses were given from the CPU to instruct the writing of data into memory 24, the data is written based upon the discontinuous addresses in memory 24. Thus, even if the contents of storage memory 24 were illegally read out by some illegal approach, the contents of memory 24 cannot be recognized, and an attempt to illegally analyze the contents of the memory can be prevented. Thus, the illegal use of IC card 100 can be securely prevented and security in the use of the card can be remarkably improved.

The present invention is not limited to only the foregoing embodiment, but may be properly modified and embodied within a range of the spirit of the invention. For example, as previously mentioned, the scrambling method described can be also substituted by other scrambling methods.

As described in detail above, according to the IC card identification system of the invention, even in any case where the personal identification number "PIN" which is entered from the card terminal is coincident or incoincident with the registered personal identification number "R-PIN" which has previously been stored in the IC card, the first and second processing time periods which are required for the coincident/incoincident processes can be set to substantially the same time periods by use of the timer. Therefore, it is possible to eliminate the conventional problem such that the "PIN" can be decrypted with the knowledge of the difference between the processing time periods when the result of the card identification indicates the coincidence and when it indicates the incoincidence. Thus, an attempt to illegally decrypt the "PIN" can be prevented, and the illegal use of the IC card can be securely prevented. Thus, security in the use of the card can be remarkably improved.

What is claimed is:

1. An IC (integrated circuit) card, comprising:
   means for comparing a first identification number entered by a cardholder with a second identification number previously stored in the IC card, and for determining whether or not said first identification number is coincident with said second identification number;
   storage means for storing at least said second identification number;
   means for holding a comparison result obtained by said comparing means, wherein said comparison is indicative of a coincidence or a non-coincidence with said second identification number;

first count means for counting a predetermined time period after the cardholder enters the first identification number; and output means for outputting the comparison result when said first count means ends counting of said predetermined time period;

wherein a time lapse from an entry by a cardholder of said first identification number until a comparison result indicative of a coincidence is output by said output means, is equal to the time lapse from entry of said first identification number until a comparison result indicative of non-coincidence is output.

2. A card as claimed in claim 1, further comprising:

scrambling means coupled to said storage means, for scrambling first addresses sent from control means to produce second addresses different from the first addresses, said second addresses being sent to said storage means.

3. A card as claimed in claim 2, wherein said scrambling means includes:

latch means for latching said first addresses sent from control means and delivering them in response to read/write commands; and a memory section for storing said second addresses in relation to said first addresses and outputting said second addresses into said storage means when said first addresses are transferred from the latch means.

4. A card as claimed in claim 3, wherein said first and second addresses are 8-bit addresses.

5. An IC card according to claim 1, further comprising:

means for generating a coincident command when said comparing means determines that said first identification number is coincident with said second identification number, said comparing means executing a first number of processing steps to generate said coincident command; and means for generating a non-coincident command when said comparing means determines that said first identification number is non-coincident with said second identification number, said comparing means executing a second number of processing steps to generate said non-coincident command, and wherein said second number is different from said first number; and said holding means is adapted to hold either of said coincident or said non-coincident commands.

6. An IC card according to claim 5, wherein said non-coincident command generating means comprises second count means for counting a number of successive non-coincident comparison results determined by said comparing means, and means for invalidating the IC card when a value counted by said second count means reaches a predetermined value.

7. An IC card according to claim 5, wherein said first count means is adapted to count a time period that is longer than the time period required for said comparing means to execute either of said first number of processing steps or said second number of processing steps.

* * * * *